United States Patent [19]

Izawa et al.

[11] Patent Number: 5,144,212
[45] Date of Patent: Sep. 1, 1992

[54] DISPLAY PROCESSING APPARATUS

[75] Inventors: Satoru Izawa; Mitsutaka Sumita, both of Aichi, Japan

[73] Assignee: Mitsubishi Denki K.K., Tokyo, Japan

[21] Appl. No.: 618,553

[22] Filed: Nov. 27, 1990

[30] Foreign Application Priority Data

Feb. 13, 1990 [JP] Japan .................................. 2-32151

[51] Int. Cl.⁵ .............................................. G05B 19/18
[52] U.S. Cl. .................................. 318/569; 364/927.2
[58] Field of Search ............... 318/569, 570; 364/521, 364/927.2; 219/69.11, 69.13

[56] References Cited

U.S. PATENT DOCUMENTS

| | | | |
|---|---|---|---|
| 4,332,995 | 6/1982 | Ito et al. ........................ | 219/69.13 X |
| 4,574,364 | 3/1986 | Tabata et al. ................. | 364/927.2 X |
| 4,959,803 | 9/1990 | Kiyohara et al. .............. | 364/521 |

Primary Examiner—William M. Shoop, Jr.
Attorney, Agent, or Firm—Sughrue, Mion, Zinn, Macpeak & Seas

[57] ABSTRACT

The invention relates to a display processing apparatus which may be used in instances when a single display is to be used to represent multiple parameters whose values may be correlated or interrelated with one another. The invention is particularly useful when simultaneously displaying a plot of position vs. time and some other parameter whose value changes with position, time, or both. Correlative display is made possible by a technique which samples the values of all of the related parameters at intervals, and stores the sampled values along with an indication of the elapsed time. In this manner, positional or other parametric data corresponding to distinct points or ranges of time can be extracted and displayed in time-correlated fashion.

13 Claims, 10 Drawing Sheets

DISPLAY PROCESSING APPARATUS

BACKGROUND OF THE INVENTION

This invention relates to a display processing technique for use in instances when a single display is used to represent multiple parameters whose values may be correlated or interrelated with one another. Most particularly, the invention is useful when simultaneously displaying a plot of position vs. time and some other parameter whose value changes with position, time, or both. As one example of the utility of the invention, an application to a numerical control device for an electric discharge machining apparatus will be disclosed herein. According to the invention as applied to such a system, upon the designation of a portion or "range" of a machining trace graphic display, i.e., a display Of the machining path along the workpiece, the designated range of the machining trace graphic display is magnified. At the same time, a graphic display of machining voltage or machining speed versus machining elapsed time corresponding to the magnified trace is displayed.

Figure 9:
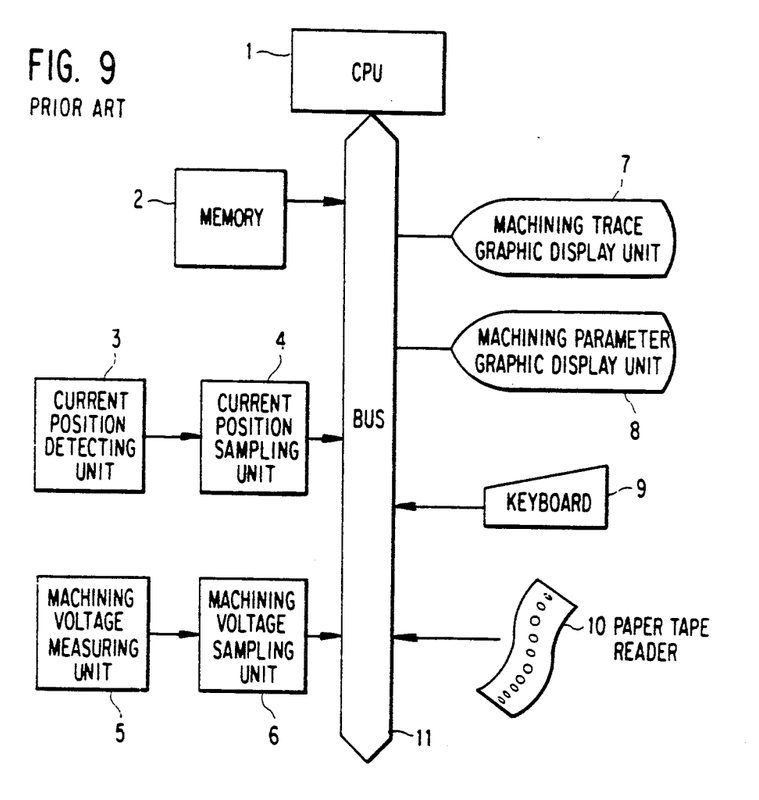
FIG. 9 is a block diagram of a conventional numerical control device for an electric discharge machining apparatus.

FIG. 9 is a block diagram of a conventional numerical control device for an electric discharge machining apparatus. In this drawing, 1 is a central processing unit (hereinafter referred to as a CPU) for analyzing input information, 2 is a memory for storing machining condition data and the like, 3 is a current position detecting unit for detecting the current machining position, 4 is a current position sampling unit for sampling the current position data from the position detecting unit 3 at certain intervals of time, 5 is a machining voltage measuring unit for measuring machining voltage, 6 is a machining voltage sampling unit for sampling the machining voltage data at certain intervals of time, 7 is a machining trace graphic display unit for displaying a machining trace, 8 is a machining voltage graphic display unit for displaying a plot of machining voltage versus machining time, 9 is a keyboard for accepting key operations in designating a range or frame or the like, 10 is a paper tape reader for reading machining data punched in paper tape form, and 11 is a bus connecting the CPU 1, memory 2, current position sampling unit 4, machining voltage sampling unit 6, machining trace graphic display unit 7, machining voltage graph display unit 8, keyboard 9, and paper tape reader 10 together.

Figure 10:
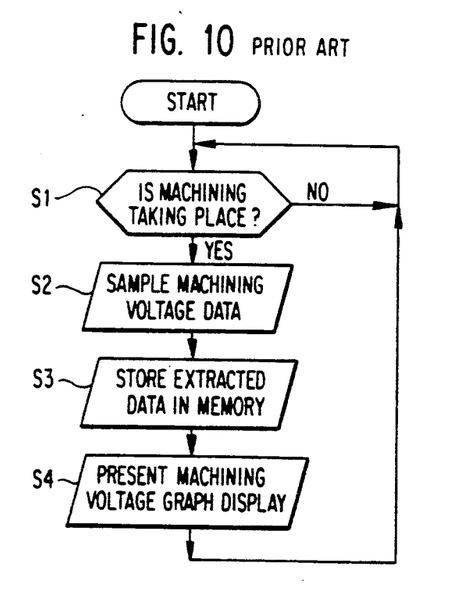
FIG. 10 is a flowchart showing machining voltage sampling processing in the conventional numerical control device.
Figure 11:
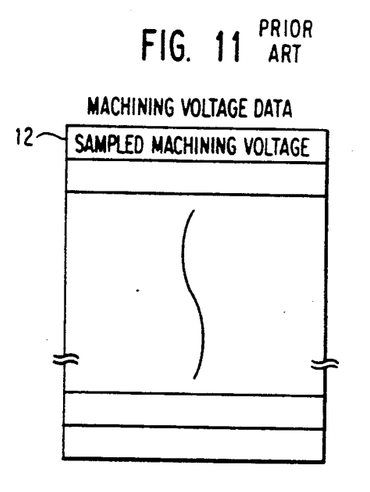
FIG. 11 is a structural diagram of the machining voltage sampling data.

The operation of the foregoing conventional device will be described. As shown in FIG. 10, in step S1, it is judged whether machining is taking place or not. If no machining is taking place, step S1 is simply repeated. On the other hand, if machining is taking place, in step S2, machining voltage data 12 sampled by the machining voltage sampling unit 6 is extracted. In step S3, the data extracted in step S2 is added to a group of machining voltage data points (shown in FIG. 11) stored in the memory 2. In step S4, a machining voltage graph is presented using the machining voltage data 12 thus extracted. Then, control returns to step S1 and the foregoing processing is repeated. As a result, the group of machining voltage data points are stored in the memory 2 through sampling processing.

Figure 12:
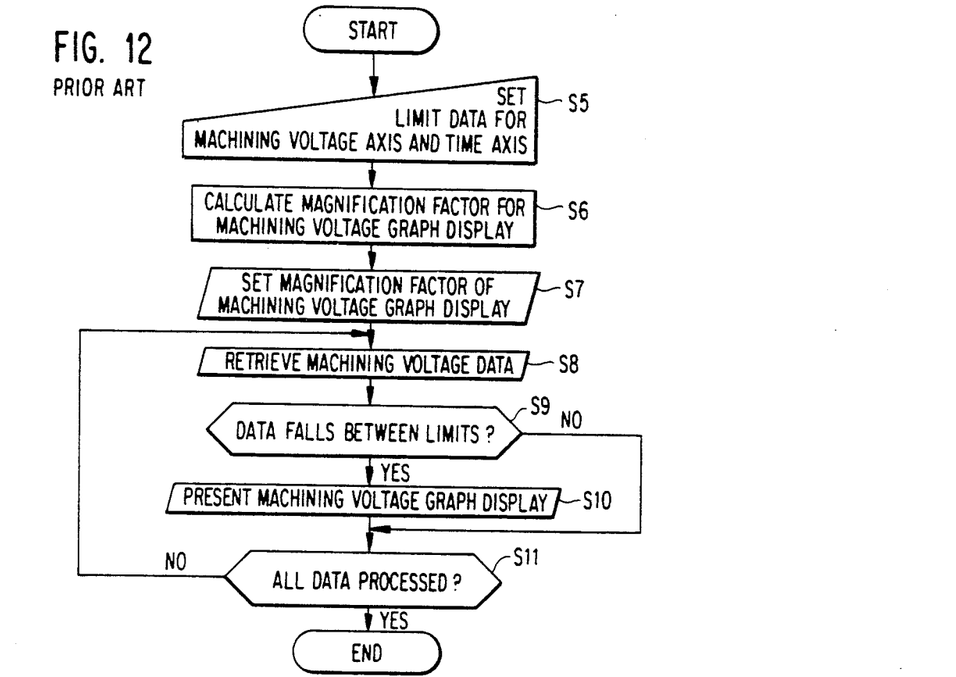
FIG. 12 is a flowchart showing machining voltage display processing in the conventional numerical control device.
Figure 13:
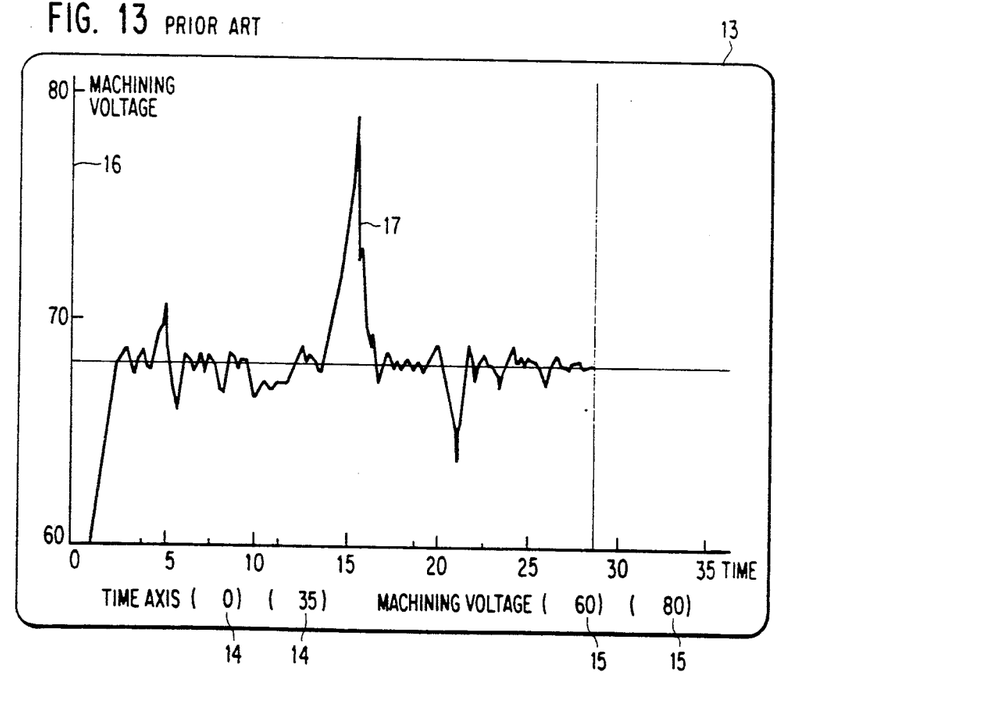
FIG. 13 is a diagram showing machining voltage display in the conventional numerical control device.

When presenting a magnified display using such data, as shown in FIG. 12, in step S5, upper and lower limit data are entered using the keyboard 9. The limit data control how much of the machining voltage axis and the machining elapsed time axis will be displayed. The ranges are indicated in given areas 14 and 15 on the display screen 13 as shown in FIG. 13. In step S6, the magnification factor of the machining voltage display is calculated using the upper and lower limit data for each axis entered in step S5, and fixed parameters relating to the size of the display region. In step S7, the magnification factor of the display screen is changed using the value calculated in step S6. With the foregoing, the preparations for graphic display of the machining voltage (steps S8 through S11) are complete.

In step S8, the machining voltage data points 12 stored in the memory 2 through machining voltage sampling processing are retrieved successively, beginning with the data collected at the start of machining. In step S9, it is judged whether or not each machining voltage data point 12 thus retrieved falls between the upper and lower voltage and time limits entered in step S5. If the data falls within these limits, in step S10, it is graphically displayed within the machining voltage display area 16, and control proceeds to step S11. On the other hand, if the data falls outside the user-defined limits, control proceeds directly to step S11. In Step 11, it is judged whether or not all of the machining voltage data points 12 have been subjected to the processing of steps S8 through S11. If not, the next datum 12 is subjected to such processing. If so, processing comes to an end.

Figure 14:
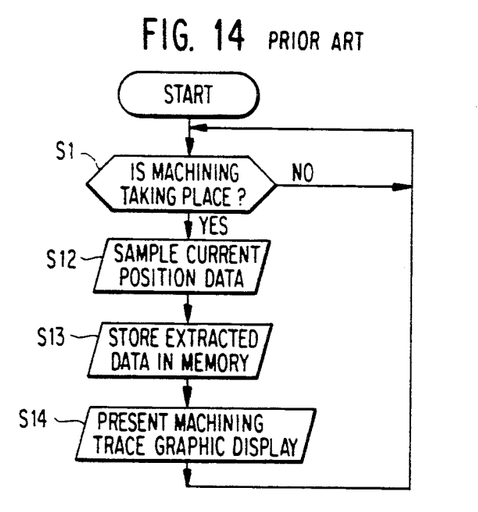
FIG. 14 is a flowchart showing current position sampling processing in the conventional numerical control device.
Figure 15:
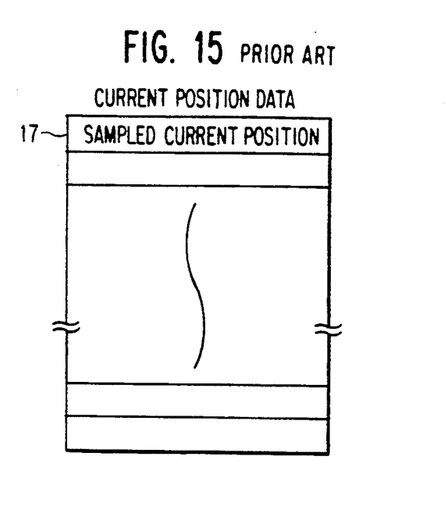
FIG. 15 is a structural diagram of the current position sampling data.

With the foregoing processing operation, a machining voltage display 17 is generated and presented o the display screen 13 as shown in FIG. 13. Display of the machining trace itself will now be described. As shown in FIG. 14, in step S1, it is judged whether machining is taking place or not. If no machining is taking place, the judgment of step S1 is simply repeated. On the other hand, if machining is taking place, in step S12, current position data 17 sampled by the current position sampling unit 4 is extracted. In step S13, the data extracted in step S12 is added to a group of current position data points (shown in FIG. 15) stored in the memory 2. In step S14, the machining trace graphic display is presented using the current position data 17 so extracted. Then, control returns to step S1 to repeat the process. As a result, the group of current position data points are stored in the memory 2 through sampling processing, to be used in generating the display.

Figure 16:
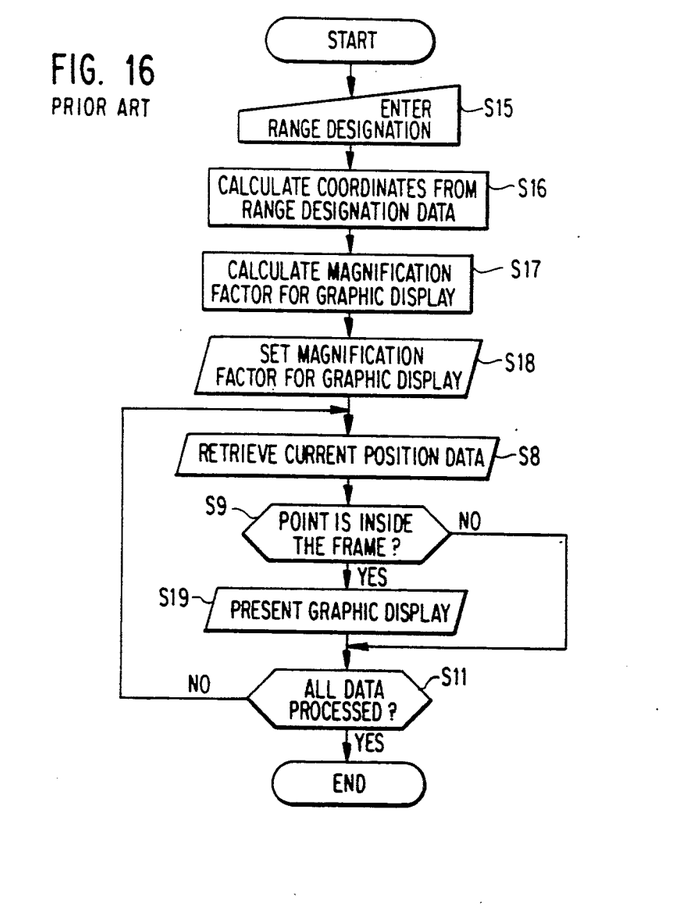
FIG. 16 is a flowchart showing machining trace graphic display processing in the conventional numerical control device.

The magnification of the machining trace graphic display will now be described. As shown in FIG. 16, in step S15, input key information for designation of the range or frame 18 shown in FIG. 17 which defines the portion to be magnified is read. In step S16, the coordinates of the range or frame thus designated are calculated on the basis of the keyed-in information. In step S17, the magnification factor is calculated so as to enlarge the designated frame 18 to the size of the overall display area. In step S18, the existing magnification factor is changed to the factor calculated in step S17. With the foregoing, the preparations for the graphic display of the machining trace (performed in steps S8 through S11) are complete.

In step S8, the current position data points 17 stored in the memory 2 through the sampling processing of FIG. 14 are retrieved successively starting from the machining start point. In step S9, it is judged whether or not the coordinates of the position data point 17 currently being retrieved place it inside the frame obtained in step S16. If the point is inside the frame, in step S19, this current position data point 17 is graphically displayed on the trace display area 24, and control proceeds to step S11. On the other hand, if the point is not inside the frame, control proceeds directly to step S11. In step S11, it is judged whether or not all the current position data points 17 have been subjected to the processing of steps S8 through S11. If not, the next current position data point 17 is subjected to this processing. The flowchart process is completed when all the data points have been processed.

Figure 17:
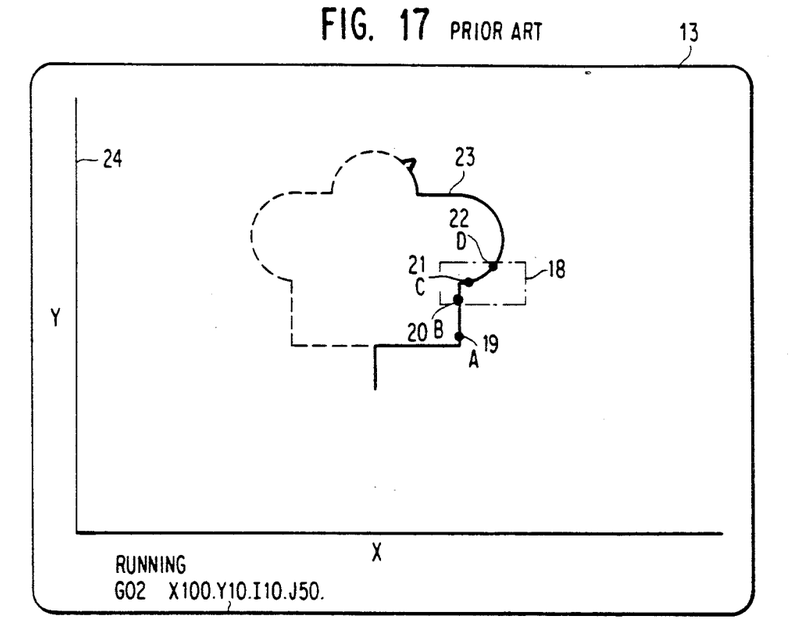
FIG. 17 a diagram showing a machining trace graphic display in the conventional numerical control device in which a range of magnification has been designated.
Figure 18:
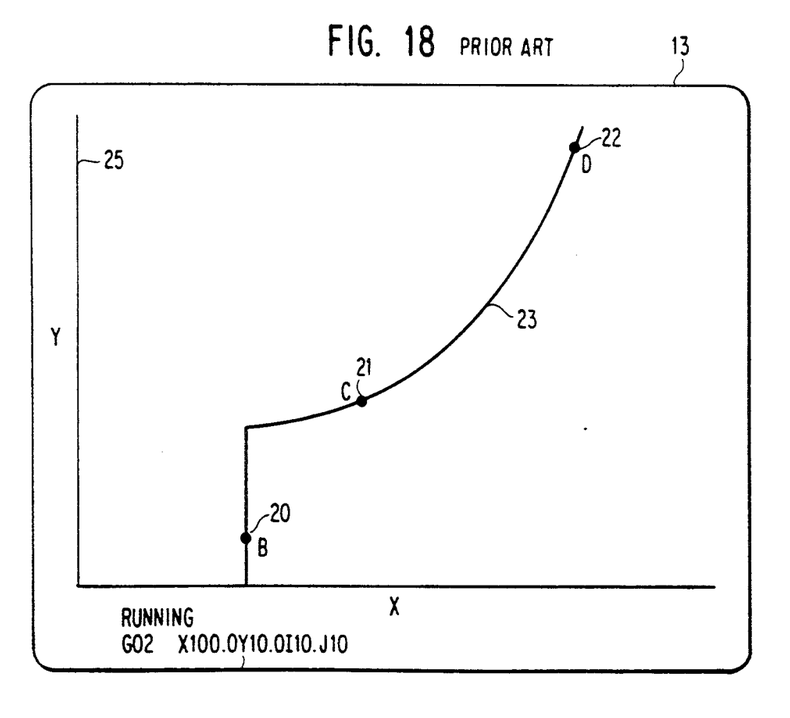
FIG. 18 is a diagram showing the machining trace graphic display as magnified after the designation of the range.

With the foregoing graphic display processing, the machining trace 24 is initially presented on the display unit 13 as shown in FIG. 17. Through a series of cursor operations, the portion of the machining trace which is to be magnified for further display is designated. While there are several ways of accomplishing this designation, one manner which may be used is to designate points B, C and D (reference numerals 20–22) on the trace by the use of the cursor, to thereby allow automatic determination of the frame 18 defining the portion to be magnified. Following the determination of the frame, that portion of the machining trace inside the frame 18 is displayed on the graphic display area 25 in magnified form as shown in FIG. 18.

As described above, the prior art adopts both machining graphic display processing and machining voltage display processing, but the two processes are completely independent of each other.

Although the foregoing description concerns machining voltage display processing, machining speed display processing in the prior art is similar and is also completely independent of trace display processing. Where a machining speed graphic display is to be presented, the machining voltage detecting unit 5 of FIG. 9 would be replaced with a machining speed detecting unit, and the machining voltage sampling unit 6 would be replaced with a machining speed sampling unit. The software would be essentially unchanged.

With the foregoing configuration of the conventional electric discharge machining apparatus, when the operator wishes to present on the display unit a graph of machining voltage or machining speed versus elapsed machining time, the elapsed time range must be set. In this connection, if it is desired to see the voltage pattern during the machining of a selected part of the workpiece, it is necessary for the operator to determine the time when machining of the portion of interest starts and when it ends. However, this is quite difficult to do in practice because there is no easy way of correlating the position data to the speed or voltage data. As a result, the operator cannot easily determine which portion of the shape being machined corresponds to what part of the graph of machining voltage versus elapsed machining time. Thus, the graphic data thus presented cannot be utilized effectively.

SUMMARY OF THE INVENTION

The present invention has been devised to solve the foregoing defects. It is an object of the present invention to provide a numerical control device for an electric discharge machining apparatus in which, for example, the simple designation of a range on the displayed machining trace allows presentation of both a magnified display of the portion of the machining path of interest, corresponding to the range designated, and a graphic display corresponding thereto of machining voltage or machining speed versus elapsed machining time; and in which, as a further example, the designation of a given range on the machining voltage or machining speed display allows presentation of a display of the machining trace portion of correlational interest.

The numerical control device according to the invention includes a display unit which presents a graphic display of machining voltage or machining speed versus elapsed machining time, as well as a display of the machining trace. Upon the designation of, for example, a range on the machining trace, a magnified machined shape is displayed, and at the same time, a graphic display showing the variation of machining voltage or machining speed in relation to the elapsed machining time between the start and end positions of the magnified portion of the machined shape is displayed. Several other display options are also available, as described in the following detailed description.

According to the display system of the present invention, for example, upon the designation of a range on the machining trace graphic display, there is obtained the machining elapsed time at the start position and the end position of the designated portion of the machined shape, and the variation of the machining voltage or the machining speed within this interval is graphically displayed on the display unit.

BRIEF DESCRIPTION OF THE DRAWINGS

In the drawings, identical or corresponding portions are designated by the same reference numeral or symbol.

DETAILED DESCRIPTION OF THE PREFERRED EMBODIMENTS

Embodiments of the present invention will now be described with reference to the drawings. In FIGS. 1 through 8k, components and portions identical with or corresponding to those of the conventional system shown in FIGS. 9 through 18 are designated by the same reference symbols, and their descriptions will not be repeated.

Figure 1:
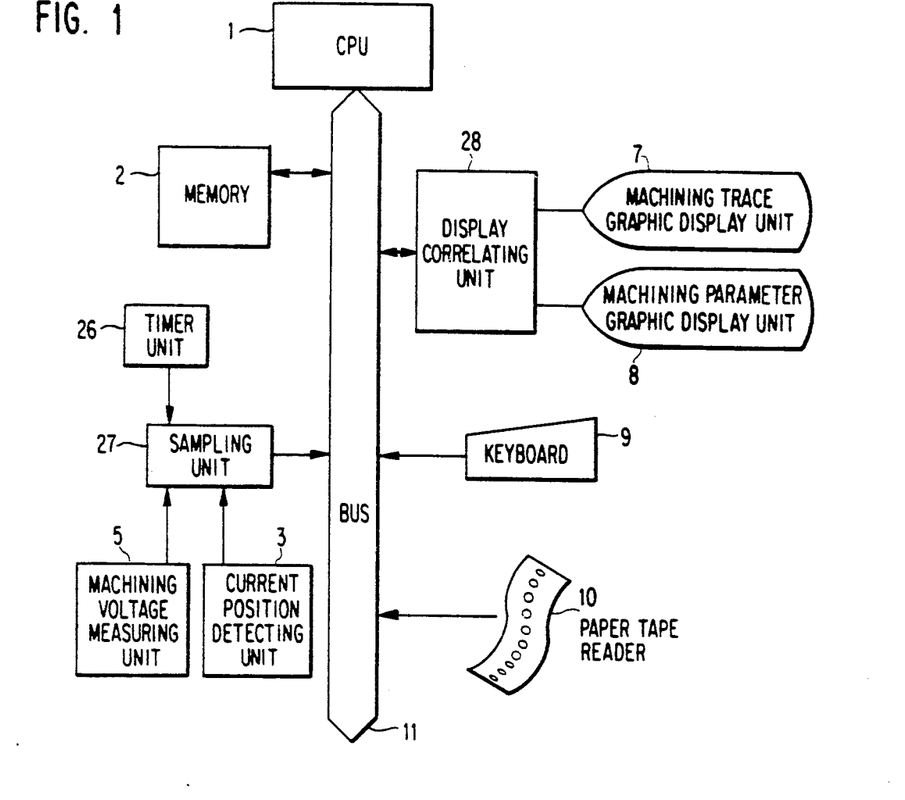
FIG. 1 is a block diagram showing a numerical control device for an electric discharge machining apparatus according to an embodiment of the present invention.

In FIG. 1, elements which are analogous to those in FIG. 9 are similarly labeled. In this figure, 26 is a timer unit for counting the elapsed machining time, and 27 is a sampling unit for sampling data from the timer unit 26, machining voltage measuring unit 5 and current position detecting unit 3 at a certain sampling interval, which may be on the order of 50 ms. Reference numeral 28 indicates a display correlating unit for causing the machining trace graphic display unit 7 and the machining voltage display unit 8 to operate in correlation, as discussed in detail below.

Figure 6:
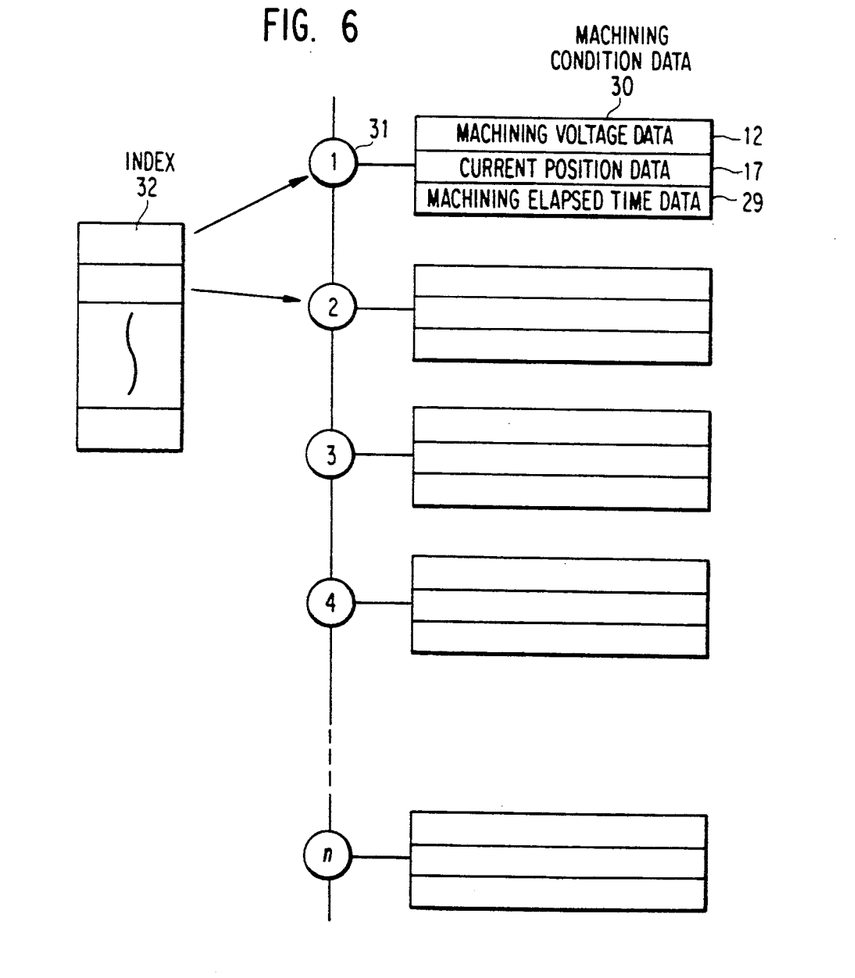
FIG. 6 is a structural diagram of the arrangement of the data subjected to the foregoing processing.

FIG. 6 schematically represents the arrangement of the memory space in the storage of machining data. At each time interval of about 50 ms, readings of the machining position, the machining voltage (or speed, etc.) and the elapsed machining time are taken. These data are stored together as a block 30 in the memory. In FIG. 6, in the block 30, reference numeral 29 indicates the elapsed machining time data, 12 is the machining voltage data, and 17 indicates the current position data, all of which are sampled, as noted, by the sampling unit 27. Reference numeral 31 represents a pointer for each machining condition data block 30, and 32 is an index which is used to store the pointers of blocks having machining condition data falling inside of the range or frame designated by the user on the machining trace graphic display or the machining voltage display, as described in more detail below.

Figure 8:
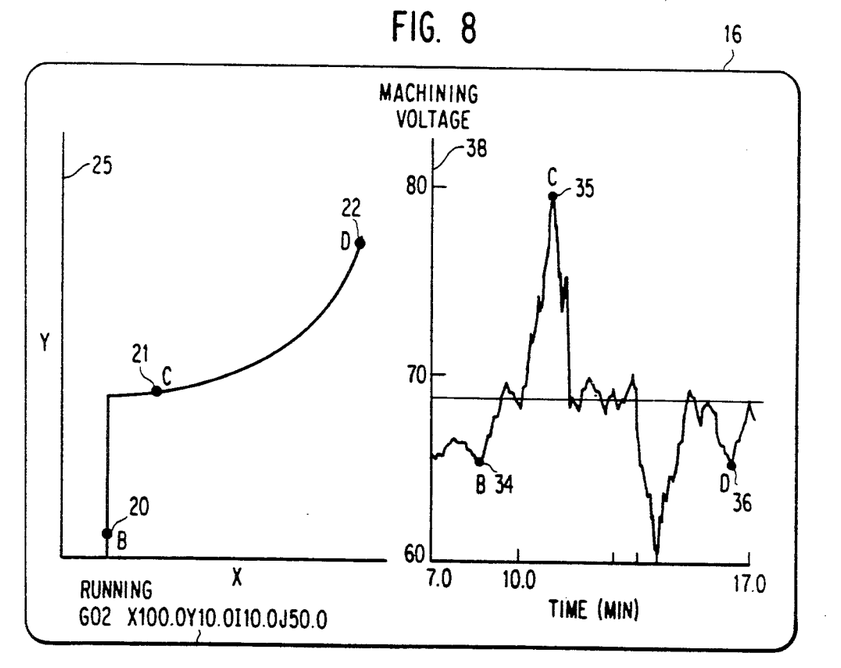
FIG. 8 is a diagram showing in correlative relation the machining trace display and the machining voltage display, as magnified, after the designation of the range on the trace display.

FIG. 8 shows one example of the display obtained according to the invention. In FIG. 8, 38 is a machining voltage display showing the variation of machining voltage in correlation to a part of the machining trace graphic display 25 presented in magnified form in accordance with the designated range or frame.

Figure 2:
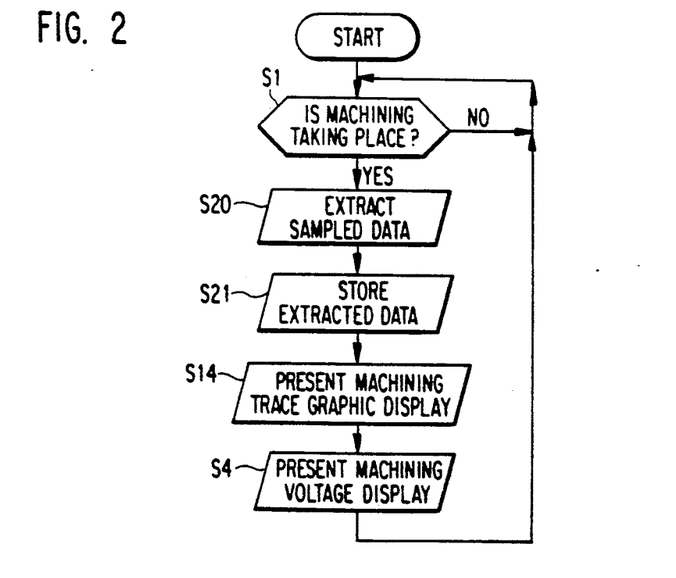
FIG. 2 is a flowchart showing machining condition sampling processing according to one embodiment of the present invention.

The operation of this embodiment will now be described. As shown in FIG. 2, in step S1, it is judged whether machining is taking place or not. If no machining is taking place, step S1 is repeated. If machining is taking place, in step S20, the sampling unit 27 extracts the machining elapsed time data 29 from the timer unit 26, the current position data 17 from the current position detecting unit 3, and the current machining voltage data 12 from the machining voltage measuring unit 5. In step S21, a machining condition data block 30 as shown in FIG. 6 is formed and stored in the memory 2 using the data extracted in step S20. In step S14, the machining trace graphic display is presented using the current position data 17 extracted in step S20. In step S4, the machining voltage display is presented using the machining voltage data 12 extracted in step S20. Then, control returns to step S1. As a result, machining condition data blocks 30 are formed and stored in the memory 2, and a substantially conventional display is generated on the display screen.

Figure 3:
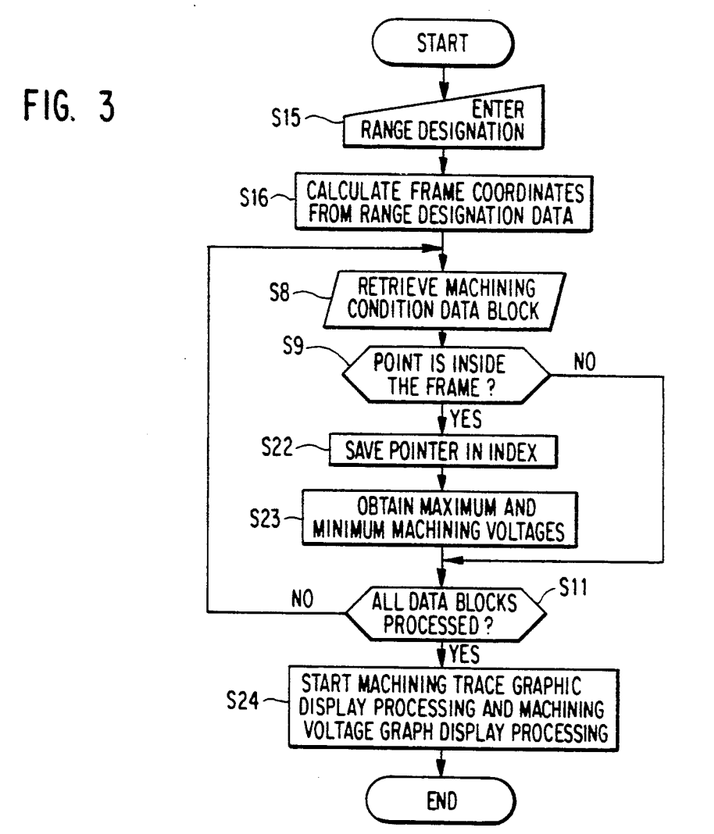
FIGS. 3, 4, 5 and 5A are flowcharts showing correlative processing of data for a machining trace display and a machining voltage display according to the present invention.

When presenting a correlated magnified display using such data, the exact process employed depends on which of several display options is employed. For present purposes, view of the machining voltage variations encountered when machining a particular portion of the workpiece. In this case, as shown in FIG. 3, in step S15, information input from the keyboard is read, which is indicative of a range whose frame 18 defines the portion of the machining trace of interest. In step S16, the coordinates of the range or frame designated by the input information are calculated. In step S8, the machining condition data blocks 30 stored in the memory 2 through the machining condition sampling processing of FIG. 2 are retrieved successively starting from the block corresponding to the start of machining, i.e., in a time-ordered fashion. In step S9, it is judged whether or not the point expressed by the coordinates of the current position data 17 included in the machining condition data block 30 thus retrieved is inside the frame calculated in step S16. If the point is inside the frame, in step S22, the pointer 31 of the machining condition data block 30 is saved in the index 32. In step S23, overall maximum and minimum machining voltages are obtained (and updated), referring to the machining voltage data included in the "saved" machining condition data blocks. On the other hand, if the point is not inside the frame, control directly proceeds to step S11. In step S11, it is judged whether or not all the machining condition data 30 blocks have been subjected to the processing of steps S8 through S11. If not, the next block 30 is subjected to this processing. On the other hand, if all the blocks have been processed, control proceeds to step S24. In step S24, on the basis of the index 32 obtained in steps S15 through S11, machining trace graphic display processing (as shown in FIG. 4) and machining voltage display processing (as shown in FIG. 5) are started, following which processing comes to an end.

Figure 4:
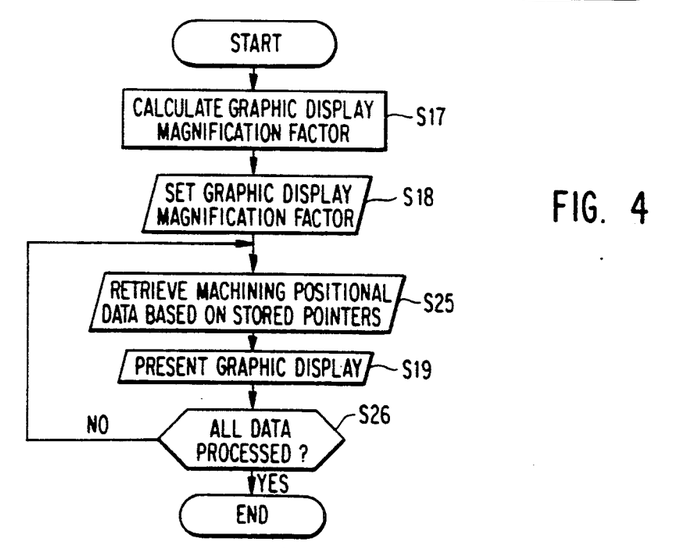

According to the machining trace graphic display processing of FIG. 4, started in step S24 of FIG. 3, in step S17, the factor of graphic display magnification is calculated on the basis of the coordinates of the frame obtained in step S16. In step S18, the magnification factor of the display screen is set to correspond to the factor calculated in step S17. In step S25, the machining condition data blocks 30 indicated by pointers stored in the index 32 obtained in step S22 are read. In step S19, the machining trace display is presented on the basis of the current position data 17 included in the machining condition data blocks 30 thus read. In step S26, it is judged whether or not all the pointers 31 stored in the index 32 (and the blocks 30 associated therewith) have been subjected to processing. If not, the next pointer 31 is read and the corresponding data block is subjected to the processing of steps S25 through S26.

Figure 5:
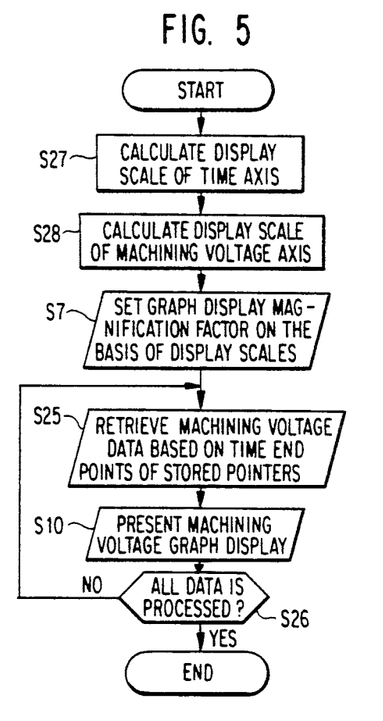

According to the machining voltage display processing of FIG. 5 started in step S24, in step S27, the scale for the time axis of the machining voltage display is obtained on the basis of the earliest and latest elapsed machining time data included in the machining condition data blocks whose pointers are stored in the index 32 obtained in step S22. This process does not require running through all the data again since the time data corresponding to the first and last entries in the index will yield this information. (As indicated previously, the data blocks are processed in time order, and thus the pointers appear in the index in chronological order of the elapsed time data). In step S28, the scale for the machining voltage axis is obtained on the basis of the maximum and minimum machining voltages obtained in step S23. In step S7, the magnification factor for the machining voltage data is set on the basis of the scale of the time axis as obtained in step S27 and the scale of the machining voltage axis as obtained in step S28. In step S25, the voltage data of the machining condition data blocks 30 having elapsed time values between the earliest and latest times determined in step S27 are read. It should be noted that this reading step is not limited to the data blocks whose pointers appear in the index 32. Rather, the voltage data of all of the data blocks in the memory that fall within the elapsed time interval obtained in step S27 are read. A specific example of the importance of this distinction will be discussed later in connection with FIG. 5A.

In step S10, the machining voltage display is presented in its area of the display screen on the basis of the machining voltage data 12 and the elapsed machining time data 29 included in the machining condition data blocks as thus read.

Figure 7:
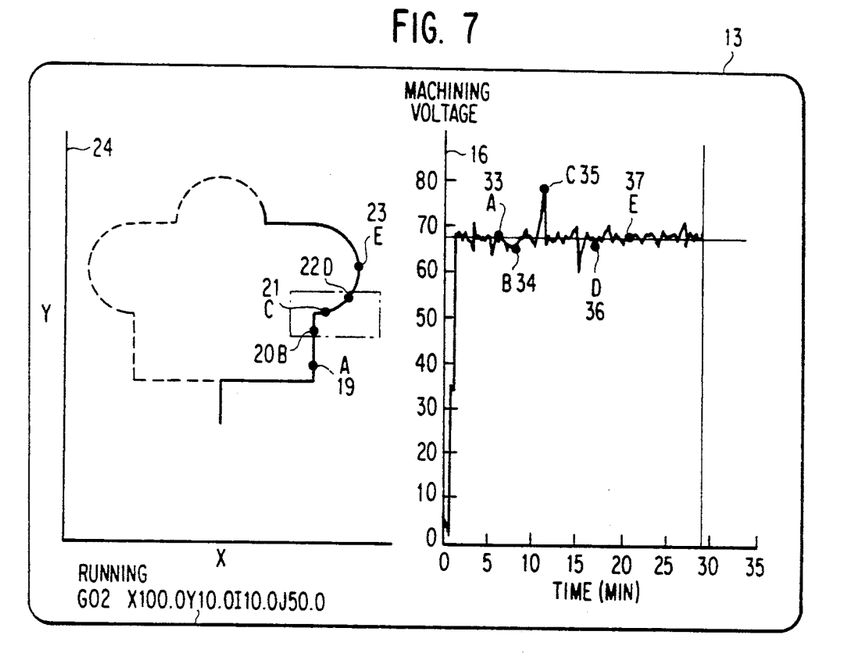
FIG. 7 is a diagram showing a machining trace display (on the left) on which a range to be magnified has been designated, and (on the right) a graph of the machining voltage.

Through the foregoing processing, the machining trace display 24 and the machining voltage display 16 are presented on the display unit 13 shown in FIG. 7. The variation of the machining voltage corresponding to the machining trace thus displayed is displayed in the machining voltage display area 38.

As noted above, when reading the voltage data for use in preparing the machining voltage vs. elapsed time graph, all of the voltage data between the determined beginning and end points (in time) were extracted, regardless of whether the block to which that data belonged had been selected for indexation via steps S9 and S22 (FIG. 3). This procedure is primarily of importance when the selected range contains non-time continuous trace segments, for example as shown in FIG. 5B. Here, portions 101 and 102 of the trace are machined at times which differ by an amount corresponding to the time which it takes to machine the segment 103 outside of the designated range 18. In step S9, data blocks corresponding to machining taking place along segment 103 are not indexed. However, the voltage data of these blocks will be used in generating the voltage display shown in FIG. 5C. (The magnified machining trace appears on the left hand side of FIG. 5C).

Figure 5A:
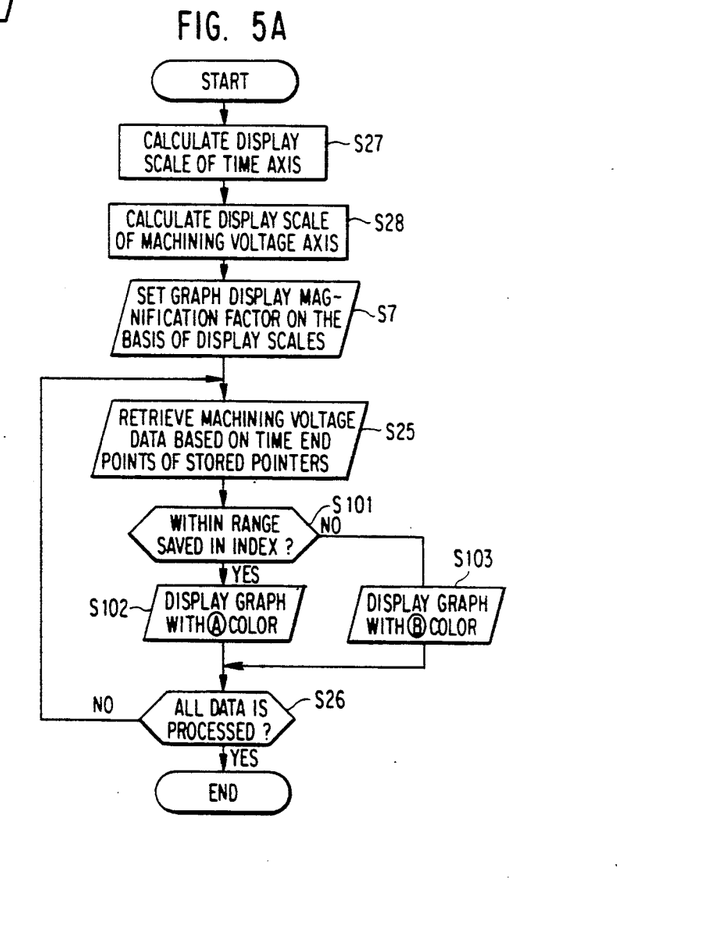
Figure 5B:
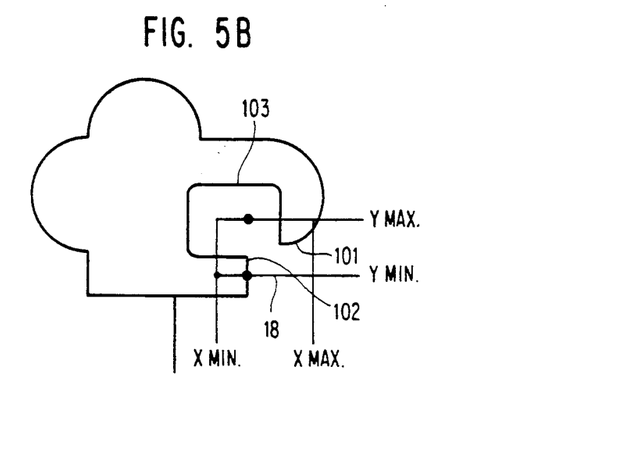
FIGS. 5B and 5C illustrate portions of the display when the designated portions of the machining trace are not all time sequentially continuous.
Figure 5C:
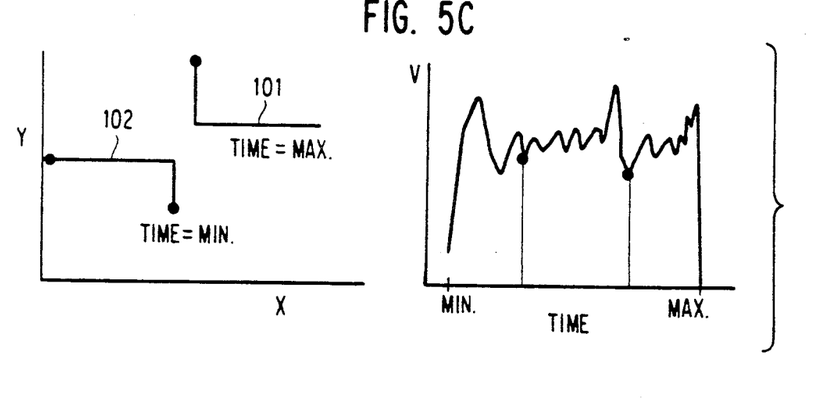

FIG. 5A is a flowchart of a procedure that can be used to highlight the voltage data which corresponds to machining outside of the designated range of the trace, i.e., such as along segment 103. This process is similar to that in FIG. 5, except that after getting the voltage data of each block within the determined time range, it is checked in step S101 whether or not the block from which this particular voltage data came was previously indexed. If not, this means that the voltage datum in question comes from an out-of-range segment such as segment 103, and in step S102, this data is treated differently than the data which belongs to a previously indexed block, which is processed in step S103. For example, the out-of-range voltage data may be displayed in a different color, or may be expressed as a dotted rather than solid line, or may be eliminated from the display altogether if desired. It is also an easy matter to delineate, such as by the display of suitable bars or markers, the beginning and end of the out-of-range voltage data, such as is seen in FIG. 5C.

The above discussion has centered around the processing that takes place when it is desired to designate a particular range on the machining trace, magnify that part of the trace, and at the same time obtain a magnified display of the machining voltages obtained during the period of time represented by the trace. However, this processing is only one example of how the data stored through the above described sampling processing technique can be employed. Other examples follow, although the processing for each need not be described in detail inasmuch as it is straightforward from the description which has already been presented.

Figure 8A:
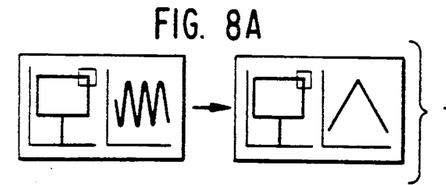
FIGS. 8a–8k each illustrate alternative display arrangements wherein the same correlative relation is exhibited.
Figure 8B:
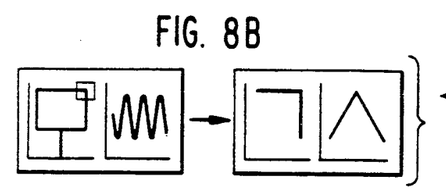
Figure 8C:
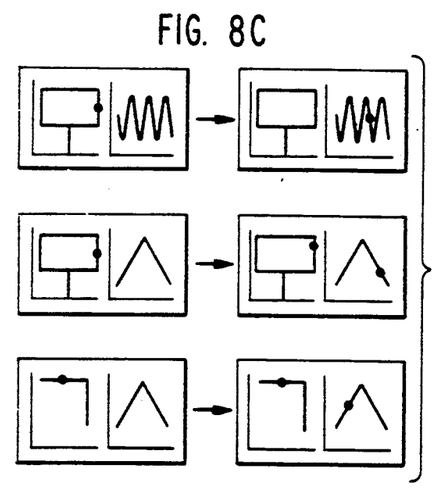
Figure 8D:
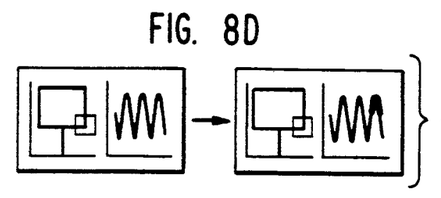
Figure 8E:
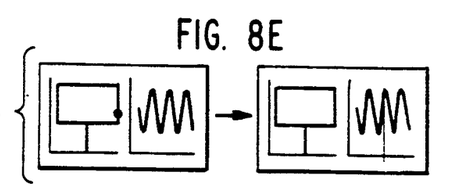
Figure 8F:
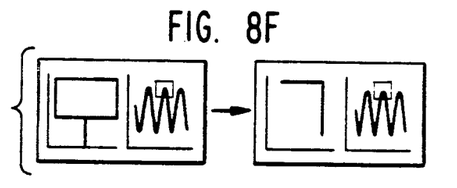
Figure 8G:
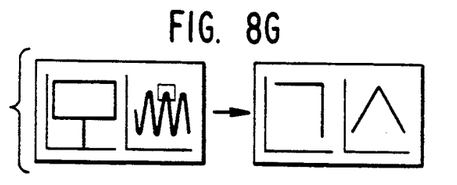
Figure 8H:
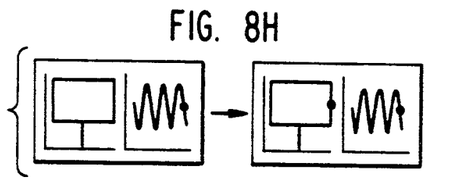
Figure 8I:
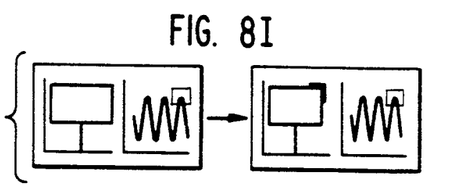
Figure 8J:
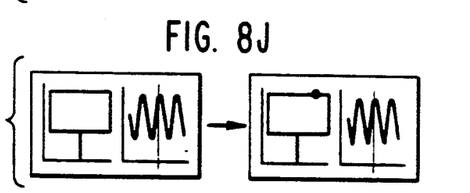
Figure 8K:
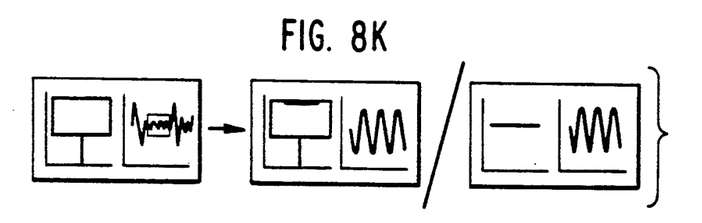

FIGS. 8a and 8k show the possible alternative ways of displaying the collected data in correlation. FIG. 8a illustrates an arrangement wherein, starting from the base configuration shown in FIG. 7 (shown at left in each of FIGS. 8a-8k), a range on the machining trace is designated, following which that part of the voltage graph which corresponds to the designated range is processed for magnified display. The only difference between this display processing technique and the described with respect to FIG. 8 is the fact that the designated portion of the machining trace is not magnified for further display. FIG. 8b illustrates the arrangement wherein the designated machining trace and the corresponding portion of the voltage graph are both magnified for further display. This arrangement corresponds identically to that shown in FIG. 8 and need not be further discussed. FIG. 8c illustrates the alternative wherein, instead of designating a range of the machining trace, only a single point on the trace is selected. In the upper illustration in FIG. 8c, which proceeds from the base configuration of FIG. 7, after the point on the machining trace is designated, the corresponding point on the voltage graph is determined and suitably highlighted on the voltage graph, e.g., by indicating the point with a spot of a different color than the remaining display. The processing for this arrangement is essentially the trivial case of that discussed with respect to FIG. 8. In the case of designating a point on the machining trace, it is not necessary to magnify either the machining trace or the voltage graph for further display. The two lower illustrations in FIG. 8c show alternatives wherein point designation is made not starting from the base arrangement of FIG. 7, but rather starting from the processed arrangements of FIGS. 8a and 8b, respectively. By first designating a range on the machining trace, and subsequently designating only a point on the trace or a magnified portion thereof, the operator can incrementally "zero in" on that part of the machining trace or the voltage graph which is of most interest.

FIG. 8d illustrates another modification wherein, upon designating a range on the machining trace, the corresponding portion of the voltage graph is highlighted, either by display in a differing color or other suitable means. No magnification of the voltage graph is necessary in this alternative. FIG. 8e shows a similar arrangement wherein only a point is designated on the machining trace. Here, the corresponding point on the voltage curve is indicated by a line perpendicular to the time axis of the graph.

FIG. 8f is the first of several alternative display processing arrangements wherein the initial designation is made by selecting a range on the voltage vs. time curve rather than on the machining trace. The processing which is involved in this arrangement is entirely similar to that described in connection with Fig, 8 and therefore will not be separately illustrated. In short, the selection and processing of the machining trace data to be subsequently displayed is carried out on the basis of the machining elapsed time data, so that the portion of the machining trace which corresponds to the time interval within the selected range of the voltage graph is made to appear in the machining trace portion of the display area, in magnified form. The arrangement shown in FIG. 8g is similar, except that here the designated range on the voltage graph is also magnified for subsequent display.

FIGS. 8h through 8j illustrate alternative display arrangements which are essentially similar to those in Figs. 8c, 8d and 8e, respectively. In FIG. 8h, designation of a point on the voltage curve results in the highlighting of the corresponding point on the machining trace. This arrangement may have two other variations, not separately illustrated, similar to those shown in FIG. 8c. FIG. 8i shows an alternative wherein the designation of a range on the voltage curve results in the highlighting of the corresponding portion of the machining trace. FIG. 8j illustrates a similar variant wherein designation of a particular point in time on the voltage graph via a line perpendicular to the time axis results in the highlighting of the corresponding point on the machining trace. Finally, FIG. 8k illustrates an alternative wherein, upon designating a range on the voltage curve, this portion of the curve is displayed in magnified form alongside either the original machining trace, with the corresponding portion highlighted, or a magnified enlargement of the corresponding section of the machining trace, as selected by the operator.

Although in the above disclosed embodiments the magnification factor of the machining trace display or the voltage display are automatically calculated following the use of frame designation, the magnification factor may be entered in the form of a number, to the same effect.

Further, although in the above embodiments display of the machining voltage has been described, the machining speed or other parameters can be presented, by replacing the machining voltage with the machining speed or other parameter, in correlative relation and in normal and magnified modes as shown.

As described above, according to the present invention, a variation of machining voltage or machining speed is displayed in graphic form in relation to the elapsed machining time from the machining start position to the machining end position of the selected portion of the machining trace, or vice versa. The changing of the magnification factor is attained by user designation of the range or frame on the machining trace graphic display area or the voltage graph, or by entering the factor of display magnification in the form of a number. With the invention, as a result of correlative processing of the machining data, the operator can instantly perceive variations of machining voltage or another machining parameter at particular physical locations of the workpiece during local machining. This ability is effected though the use of simple controls, freeing the operator from the troublesome effort to correlate the machining trace to the voltage graph, and thereby shortening the control time.

Although the invention has been described in the context of a numerically controlled machine tool such as an EDM machining apparatus, the invention has applicability to the field of display processing in general, and may find utility in any field wherein it is desired to simultaneously or sequentially display two or more parameters which are related through a common quality such as time. The invention is thus of particular usefulness in connection with monitoring or testing instrumentation capable of making multiple parametric measurements over the same or overlapping spans of time. For this reason, it is considered that the scope of the invention shall be measured solely by the claims which follow.

What is claimed is:

1. A numerical control device for an electric discharge machining apparatus comprising:
   a timer unit for counting the elapsed time of electric discharge machining;
   a machining parameter measuring unit for measuring a machining parameter;
   a current position detecting unit for detecting a current position;
   a sampling unit for periodically and concurrently sampling the elapsed time data, the machining parameter data and the current position data;
   a memory unit for storing the sampled data and machining condition data;
   display means for presenting a machining trace graphic display and a graphic display illustrating the variation of said machining parameter data with elapsed time, based on the data stored in the memory unit; and
   a display correlating unit for relating the elapsed time data, the machining parameter data and the current position data together to cause the display means to present the machining trace graphic display and the display showing the machining parameter data in correlation.

2. A numerical control device for an electric discharge machining apparatus according to claim 1, wherein said display correlating unit, upon designation of a range of said machining trace graphic display, causes said display means to present a graphic display of said machining parameter versus machining elapsed time on the basis of the machining condition data falling between the start and end positions of the range designated.

3. A numerical control device for an electric discharge machining apparatus according to claim 1, wherein said display correlating unit, upon designation of a range on said machining trace graphic display, causes said display means to present a portion of as graphic display of said machining parameter versus machining elapsed time which corresponds to the machining condition data falling between the start and end positions of the designated range in a display color different from that of a remaining portion.

4. A numerical control device for an electric discharge machining apparatus according to claim 1, wherein said display correlating unit, upon designation of a range of said machining trace graphic display, causes said display means to display a portion of the machining trace, corresponding to the range designated, in magnified form and to present a graphic display of said machining parameter versus machining elapsed time on the basis of the machining condition data falling between the start and end positions of the magnified machining trace portion.

5. A numerical control device for an electric discharge machining apparatus according to claim 1, wherein said display correlating unit, upon designation of a range on said machining trace graphic display, causes said display means to display a portion of the machining trace, corresponding to the range designated, in magnified form and to present a portion of the graphic display of said machining parameter versus machining elapsed time, corresponding to the machining condition data falling between start and end positions of the machining trace portion as partly magnified, in a display color different from that of a remaining portion.

6. A numerical control device for an electric disc machining apparatus according to claim 1, wherein said display correlating unit, upon designation of a range on said display of said machining parameter versus machining elapsed time, causes said display means to present in magnified form a portion of the machining trace corresponding to the machining elapsed time of the range designated.

7. A numerical control device for an electric discharge mach apparatus according to claim 1, wherein said display correlating unit, upon designation of a range on said display of said machining parameter versus machining elapsed time, causes said display means to present a portion of the machining trace corresponding to the machining elapsed time of the range designated on said machining trace graphic display in a display color different from that of a remaining portion.

8. A numerical control device for an electric discharge machining apparatus according to claim 1, wherein said display correlating unit, upon designation of a range on said graphic display of said machining parameter versus machining elapsed time, causes said display means to display graphic image corresponding to the range designated in magnified form and presents in magnified form a portion of the machining trace corresponding to the machining elapsed time of the range designated on said machining trace graphic display.

9. A numerical control device for an electric discharge machining apparatus according to claim 1, wherein said display correlating unit upon designation of a range on said display of said machining parameter versus machining elapsed time, causes said display means to to display a graphic image corresponding to the range designated in magnified form and presents a portion of the machining trace corresponding to the machining elapsed time of the range designated in a display color different from that of a remaining machining trace portion.

10. A numerical control device for an electric discharge machining apparatus according to claim 1, wherein said display correlating unit, upon designation of at least one point along the machining trace on said machining trace graphic display, causes the machining elapsed time and the machining parameter value at the corresponding point to be indicated on said display of said machining parameter versus machining elapsed time.

11. A numerical control device for an electric disc machining apparatus according to claim 1 wherein said displaying correlating unit, upon designation of a desired machining time point on said display of said machining parameter versus machining elapsed time, causes said display means to indicate on said machining trace graphic display a current position corresponding to the machining time designated.

12. A numerical control device for an electric discharge machining apparatus according to claim 1, wherein said display correlating unit includes means for varying display scales of the machining elapsed time, machining parameter, and machining position.

13. A system for displaying plural correlatable parameters, comprising:
  a timer unit for counting elapsed time;
  a parameter measuring unit for measuring selected parameters;
  a sampling unit for periodically and concurrently sampling the elapsed time and current values of said selected parameters, wherein at least a first of said parameters varies with time, and a second of said parameters varies as position;
  a memory unit for storing the sampled data;
  display means for presenting displays illustrating the first and second parameters, based on the data stored in the memory unit; and
  display correlating means for relating the elapsed time, the first parameter data and the second parameter data together to cause the display means to present the first parameter data and the second parameter data in correlative relation.

* * * * *